(12) United States Patent
Derryberry

(10) Patent No.: US 8,792,231 B2
(45) Date of Patent: Jul. 29, 2014

(54) EXTENDED USER INPUT

(75) Inventor: Roy Derryberry, Krum, TX (US)

(73) Assignee: Nokia Corporation, Espoo (FI)

( * ) Notice: Subject to any disclaimer, the term of this patent is extended or adjusted under 35 U.S.C. 154(b) by 439 days.

(21) Appl. No.: 13/081,081

(22) Filed: Apr. 6, 2011

(65) Prior Publication Data

US 2012/0257332 A1 Oct. 11, 2012

(51) Int. Cl.
*H05K 5/00* (2006.01)
*H05K 7/00* (2006.01)
*G06F 1/16* (2006.01)

(52) U.S. Cl.
CPC ............ *G06F 1/1671* (2013.01); *G06F 1/1637* (2013.01); *G06F 1/1662* (2013.01); *G06F 1/1684* (2013.01); *G06F 1/169* (2013.01)
USPC ............ 361/679.26; 361/679.27; 361/679.08; 361/679.09

(58) Field of Classification Search
CPC ... G06F 1/1601; G06F 1/1613; G06F 1/1615; G06F 1/1616; G06F 1/1633; G06F 1/1637; G06F 1/1656; G06F 1/1662; G06F 1/1671; G06F 1/1684; G06F 1/169
USPC ............ 361/679.26, 679.27, 679.28, 679.08, 361/679.09
See application file for complete search history.

(56) References Cited

U.S. PATENT DOCUMENTS

| | | | | |
|---|---|---|---|---|
| 6,464,195 B1 * | 10/2002 | Hildebrandt | ................ | 248/460 |
| 6,612,668 B2 * | 9/2003 | Doan | ................ | 312/223.2 |
| 6,788,530 B2 * | 9/2004 | Hill et al. | ................ | 361/679.06 |
| 6,873,521 B2 * | 3/2005 | Landry et al. | ................ | 361/679.06 |
| 2004/0057197 A1 * | 3/2004 | Hill et al. | ................ | 361/683 |
| 2004/0114315 A1 * | 6/2004 | Anlauff | ................ | 361/681 |
| 2008/0307607 A1 | 12/2008 | Kim et al. | | |

FOREIGN PATENT DOCUMENTS

| | | |
|---|---|---|
| EP | 0 913 977 A2 | 5/1999 |
| EP | 1645939 | 4/2006 |
| EP | 2141580 | 1/2010 |
| EP | 2175619 | 4/2010 |
| WO | WO2007125393 | 11/2007 |

OTHER PUBLICATIONS

"Game Controller Buttons Part Kit for Apple iPhone 4G", http://www.everbuying.com/product42951.html, downloaded Apr. 6, 2011, 2 pages.
International Search Report for International Application No. PCT/FI2012/050323—Date of Completion of Search: Jun. 21, 2012, 4 pages.
Written Opinion of the International Searching Authority of International Application No. PCT/FI2012/050323—Date of Completion of Opinion: Jun. 21, 2012, 8 pages.

\* cited by examiner

*Primary Examiner* — Anthony Haughton
(74) *Attorney, Agent, or Firm* — Locke Lord LLP

(57) ABSTRACT

An apparatus has a first body part, a second body part, and a support mechanism configured to keep the first and second body parts together while enabling a user to move the first and second body parts between a closed configuration and an open configuration. In the closed configuration, the first and second body parts are stacked and the support mechanism is sandwiched between the first and second body parts. The apparatus further has user input equipment positioned such that the user input equipment is behind the first body part and accessible to the user when the first and second body parts are in the open configuration and the user input equipment is not accessible to the user when the first and second body parts are in the closed configuration.

20 Claims, 4 Drawing Sheets

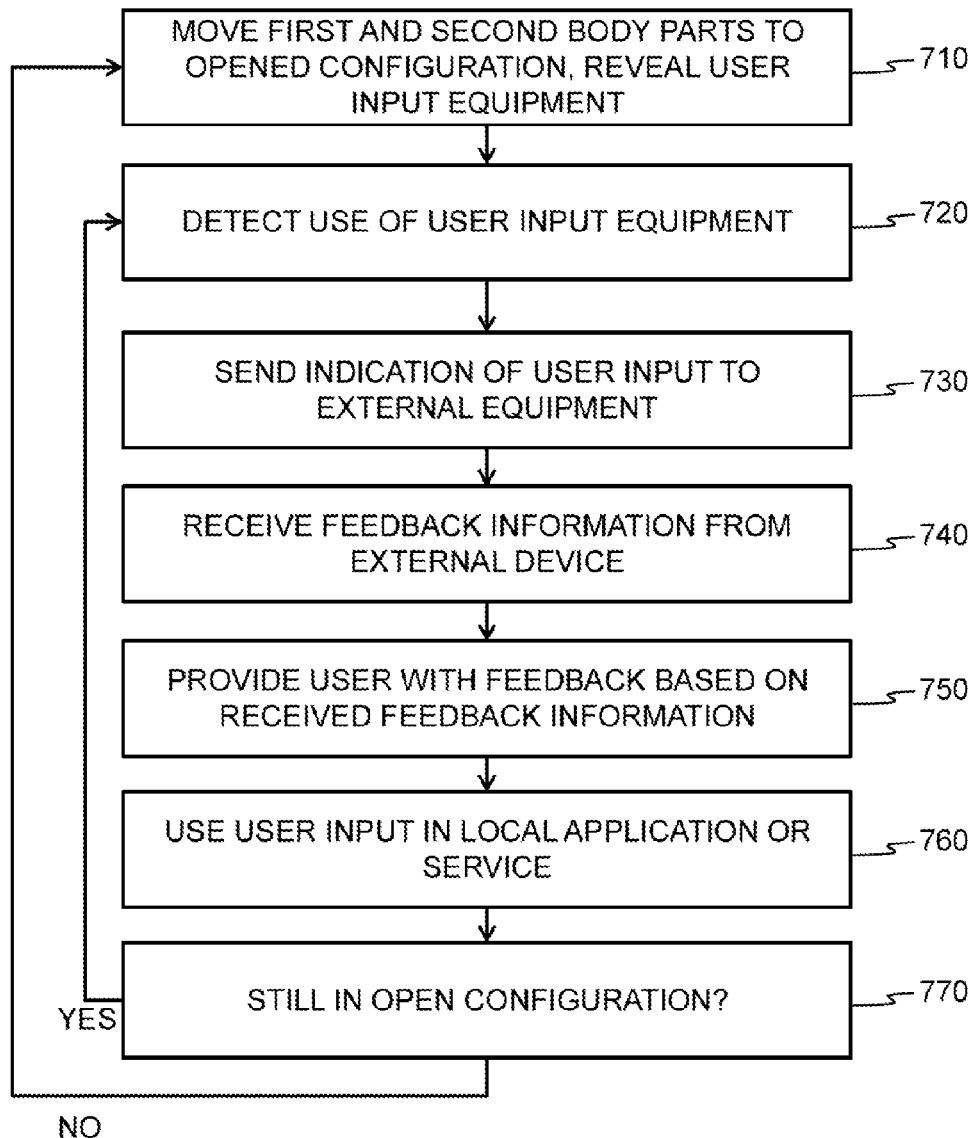

EXTENDED USER INPUT

TECHNICAL FIELD

The present application relates generally to extended user input. The present application relates particularly, though not exclusively, to providing of natural and intuitive gaming input controls on retractable portable devices.

BACKGROUND

Various portable electronic devices have user interfaces to enable interaction with a user. The user interface of portable devices is often a compromise between mutually conflicting design objectives related to cost, complexity, accessibility, intuitiveness and compactness. Mobile phones typically sport a display and one or more keys on a common side so as to enable displaying of information and input of data from the user. The display may be a touch display in which case fewer keys are needed.

Some mobile phones have a clam-shell form factor in which the phone when opened reveals on its two internal walls a display and keypad, respectively. Another form factor is a monoblock model in which there is a display and some keys which occupy most of one side of the phone. There are also slide phones with a user interface that is extended by sliding apart a display part and a keypad part.

Game controllers of different game stations are specifically designed for comfortable grip and access to controls. Such controllers typically have an arcuate form and such a size that they suitably fill the hand when gripped by a user. However, the game controllers' design makes their placing in the user's pocket difficult or impossible. There are also some mobile phones designed particularly for gaming, with keypad arrangement on a front surface around the display so dimensioned and laid out that the user should be able to reasonably access the keys.

SUMMARY

Various aspects of examples of this document are set out in the claims.

According to a first example aspect of this document, there is provided an apparatus comprising:
a first body part;
a second body part;
a support mechanism configured to keep the first and second body parts together while enabling a user to move the first and second body parts between a closed configuration and an open configuration; wherein:
  in the closed configuration, the first and second body parts are stacked and the support mechanism is sandwiched between the first and second body parts; and the apparatus further comprising user input equipment positioned such that the user input equipment is behind the first body part and accessible to the user when the first and second body parts are in the open configuration and the user input equipment is not accessible to the user when the first and second body parts are in the closed configuration.

According to a second example aspect of this document, there is provided a method comprising:
keeping with a support mechanism a first body part and a second body part of an apparatus together while enabling a user to move the first and second body parts between a closed configuration and an open configuration; wherein:
  in the closed configuration, keeping the first and second body parts are stacked and the support mechanism is sandwiched between the first and second body parts; and
  making user input equipment behind the first body part accessible to the user when the first and second body parts are in the open configuration and making the user input equipment not accessible to the user when the first and second body parts are in the closed configuration.

BRIEF DESCRIPTION OF THE DRAWINGS

For a more complete understanding of example embodiments of the present invention, reference is now made to the following descriptions taken in connection with the accompanying drawings in which:

FIG. 7 shows a flow chart of a process according to some example embodiments.

DETAILED DESCRIPTION OF THE DRAWINGS

Figure 1:
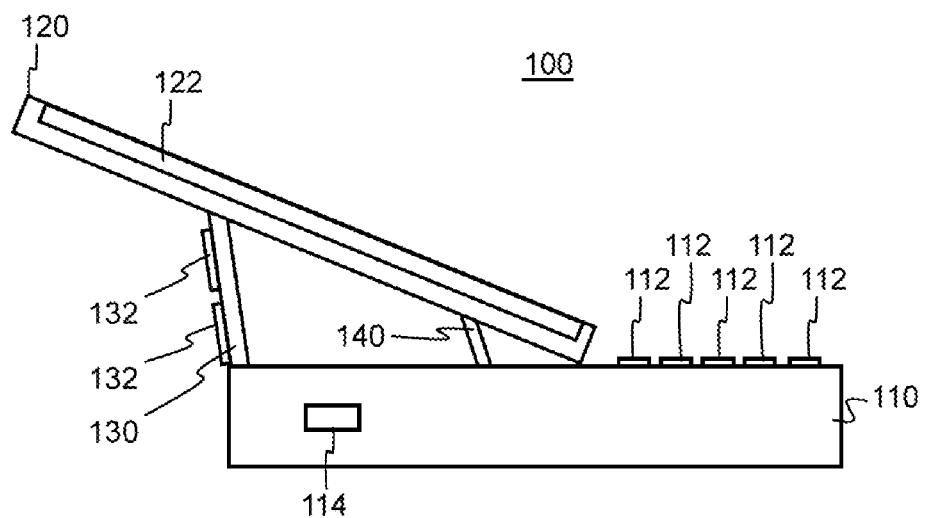
FIG. 1 shows an apparatus according to one example embodiment of this document in an opened configuration.
Figure 2:
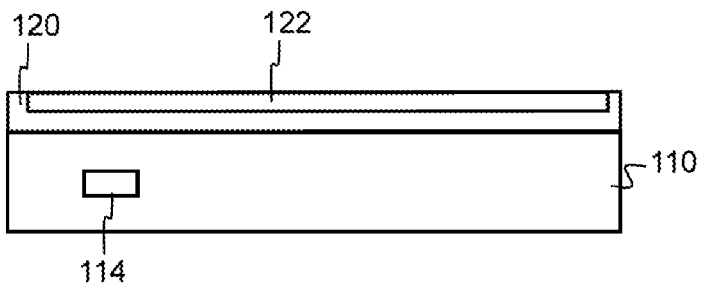
FIG. 2 shows the apparatus of FIG. 1 in a closed configuration.
Figure 3A:
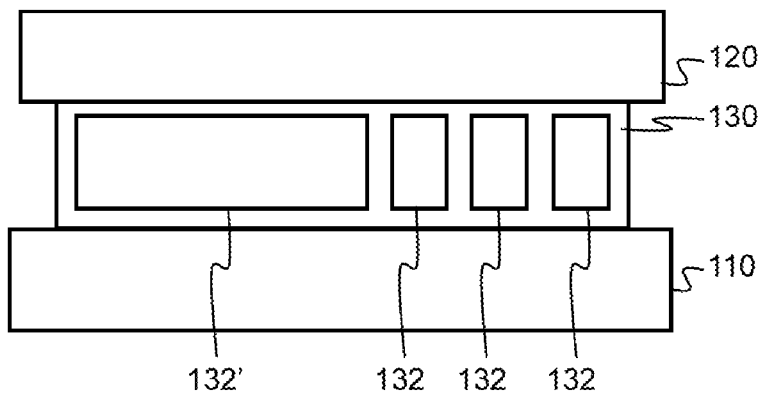
FIG. 3a shows a rear view of an apparatus according to another example embodiment of this document in an opened configuration.
Figure 3B:
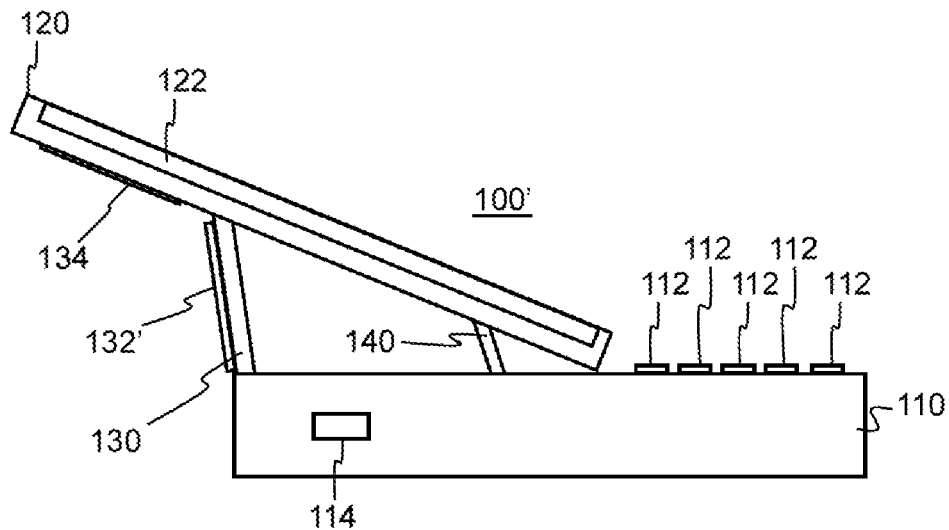
FIG. 3b shows an apparatus according to another example embodiment of this document in an opened configuration.
Figure 4:
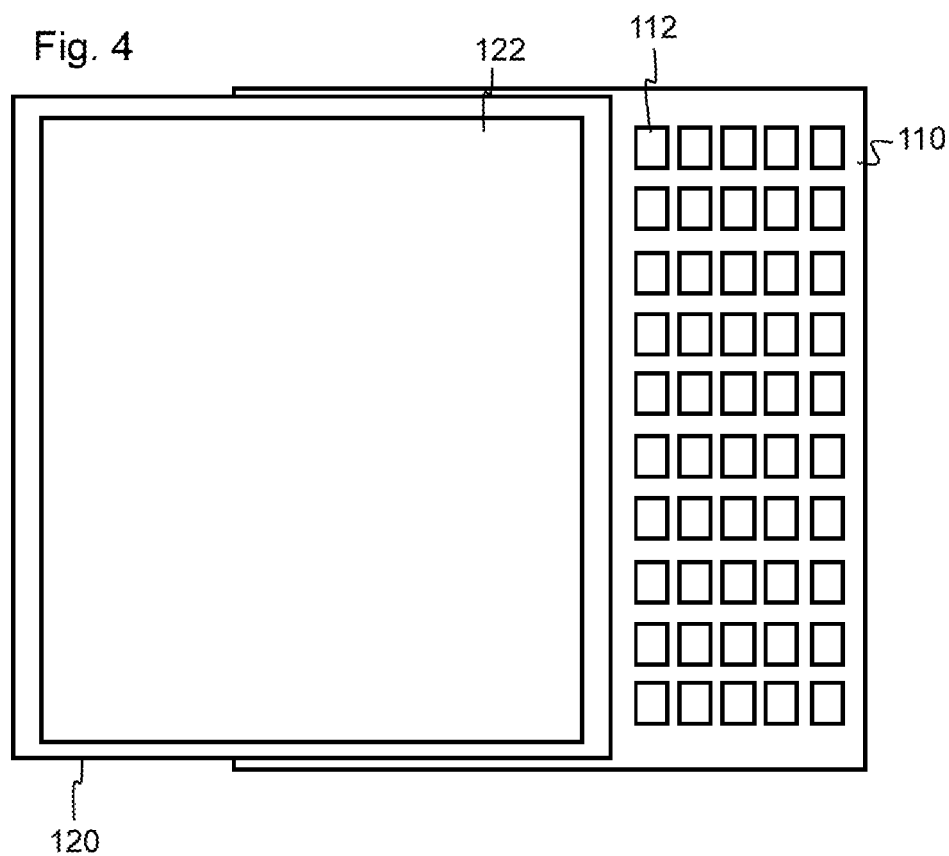
FIG. 4 shows a top view of an apparatus according to an example embodiment of this document in an opened configuration.

FIG. 1 shows an apparatus 100 according to one example embodiment of this document in an opened configuration. The apparatus has two body parts: a first body part 110 and a second body part 120. The two body parts are linked together with a support mechanism that in this embodiment comprises a tilt bridge 130 and a pivotal end support 140. The support mechanism is configured to enable mutually moving the two body parts between an opened configuration (FIG. 1) and a closed configuration (FIG. 2). FIGS. 3a and 3b illustrate apparatuses of some example embodiments of this document. FIG. 4 illustrates a further example embodiment of this document with an apparatus that is in an opened configuration.

The first body 110 part comprises, in the embodiment shown in FIG. 1, a keypad comprising a plurality of keys 112 on a face of the first body part 110. Further, there are one or more keys on other sides of the first body part 110 as key 114 in FIG. 1. In some embodiments, the tilt bridge 130 provides one or more user inputs such as keys 132 and/or a touchpad (132' in FIGS. 3a, 3b).

The second body part 120 comprises, in the embodiment shown in FIG. 1, a display 122 occupying most of the face of the second body part 120. The first and second body parts 110, 120, when in a compacted configuration (FIG. 2), conceal the support mechanism and the keys 132 and/or touchpad 132' (FIGS. 3a, 3b) on the tilt bridge as shown in FIG. 2. FIG. 3a shows a rear view of an apparatus where the tilt bridge 130 has (on its rear surface a touchpad 132' and a plurality of keys 132.

FIG. 4 shows a top view of an apparatus (e.g. that of FIG. 1 or FIGS. 3a, 3b) according to an example embodiment of this document in an opened configuration.

FIGS. 1 to 4 illustrate embodiments which enable a user to operate an apparatus using a user interface having a display and keys on the face of the apparatus. Additionally, when the apparatus is in the opened configuration, the apparatus enables a user to operate the apparatus e.g. with fingers of the user on the rear side of the apparatus, using user input equipment (e.g. key(s) 132 and/or touchpad(s) 132') supported by the tilt bridge 130. Hence, the user can, for instance, take a firm grip of the apparatus even if the apparatus had a generally rectangular or block-like shape and operate the user input equipment on the rear side of the apparatus with her pointers or middle fingers. Such a grip enables very intuitive operation of the apparatus especially for gaming applications but also for various other types of applications.

In some embodiments of this document, there is provided user input equipment (such as one or more keys and/or one or more touchpads on the back of the second body part 120 on the flange part that extends over the tilt bridge 130 e.g. as in a region 134 of FIG. 4. This embodiment may supplement or substitute the embodiments in which there is user input equipment on the tilt bridge 130.

Figure 5:
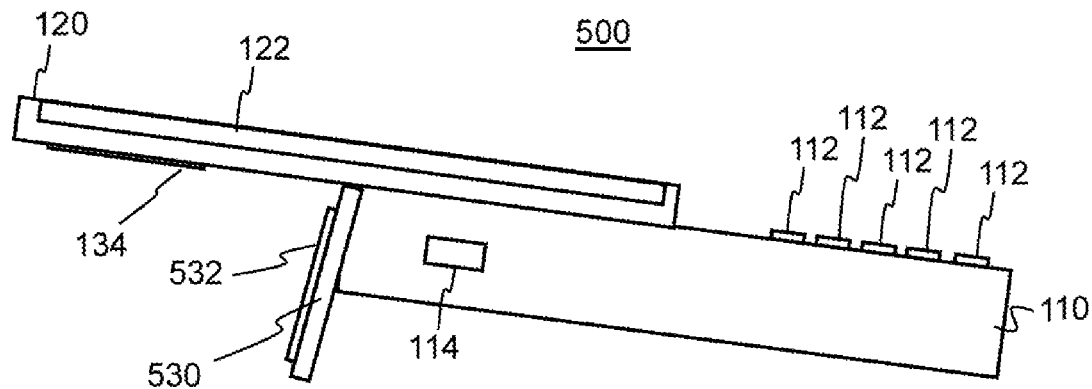
FIG. 5 shows a side view of an apparatus according to another example embodiment of this document in an opened configuration.

FIG. 5 shows a side view of an apparatus 500 according to another example embodiment of this document in an opened configuration. This example embodiment has a tilt bridge 530 that is configured to, when abut against an end of the first body part 110 so that the tilt bridge 530 tilts the apparatus 500 when laid on a desk. When the first and second body parts are brought into a compacted configuration, the tilt bridge 530 of this embodiment is configured to become sandwiched between the first and second body parts 110,120. To this end, either or both of the first and second body parts 110, 120 are recessed in some example embodiments to enable substantially concealing the tilt bridge 530 when seen from a side so that the apparatus 500 can have a side view as shown in FIG. 2.

The tilt bridge 530 of FIG. 5, in some example embodiments, is constructed such that a firm platform is provided for carrying one or more pieces of user input equipment 532 selected from a group comprising touchpads, keys and cursor control devices. When in the open configuration shown in FIG. 5, the apparatus 500 allows finger operation of the user input equipment 532. The tilt bridge 530 is dimensioned in some example embodiments such that a sufficient room is provided for the user's finger to access the user input equipment regardless whether the apparatus 500 of FIG. 5 is placed on a desk or held in hand by the user.

Figure 6:
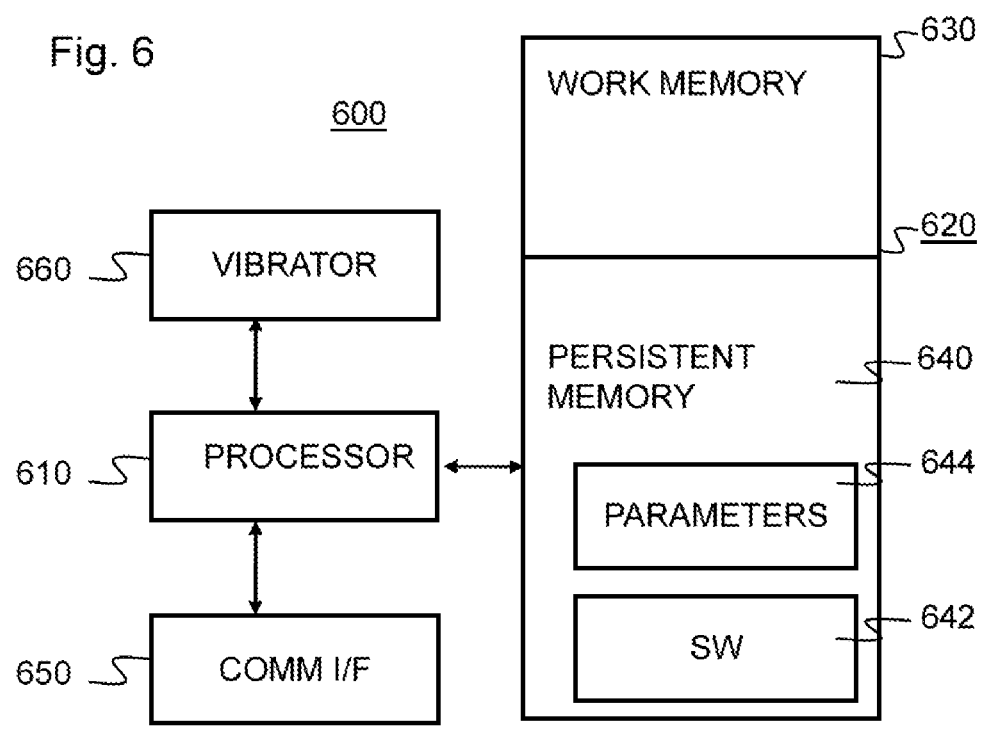
FIG. 6 shows a block diagram of an apparatus according to some example embodiments.

FIG. 6 presents an example block diagram of an apparatus 600 suited for use e.g. in one of the example embodiments described in the foregoing. The apparatus 600 comprises a communication interface module 650, a vibrator 660, a processor 610 coupled to the communication interface module 650, and a memory 620 coupled to the processor 610. The apparatus further comprises software 630 stored in the memory 620 and operable to be loaded into and executed in the processor 610. In an example embodiment, the software 630 comprises one or more software modules. The software 630 can be in the form of a computer program product that is software stored in a (non-transitory) computer readable memory medium.

The communication interface module 650 is configured to transmit information over one or more local links to external equipment such as a game console. In this example embodiment, the apparatus 600 is suited for use as a game controller for the game console. The communication interface module is further configured in some embodiments to receive information from the external equipment. The received information carries, in some example embodiments, feedback information according to which the apparatus 600 will provide user perceivable feedback to the user. The user perceivable feedback comprises, in different embodiments, for instance, tactile feedback such as vibration provided by the vibrator 660, audible feedback provided by a speaker (not shown) of the apparatus 600, visible feedback provided by a display (not shown in FIG. 6, see e.g. FIGS. 1 to 5 for display 122) of the apparatus 600, or any combination thereof. The providing of the perceivable feedback to the user is used in some embodiments to assist using of the apparatus 600 as a controller of remote equipment such as a game console.

The local links are implemented in some example embodiments as wired and/or wireless links. In one embodiment, the communication interface module 650 further implements telecommunication links suited for establishing links with other users or for data transfer (e.g. using the Internet). Such telecommunication links are, for instance, links using any of: wireless local area network links, Bluetooth, ultra-wideband, cellular or satellite communication links. Telecommunication links are used, in some embodiments, for network games. In one embodiment, the communication interface module 650 is integrated into the apparatus 600 or into an adapter, card or the like (that in one embodiment is inserted into a suitable slot or port of the apparatus 600). While FIG. 6 shows one communication interface module 650, the apparatus 600 comprises in one embodiment a plurality of communication interface modules 650.

The establishing of links with other users with the communication interface is used in some embodiment, for instance, for network gaming or real-time conferencing.

The processor 610 is, e.g., a central processing unit (CPU), a microprocessor, a digital signal processor (DSP), a graphics processing unit, an application specific integrated circuit (ASIC), a field programmable gate array, a micro apparatus 600 or a combination of such elements. FIG. 6 shows one processor 610. In some embodiments, the apparatus 600 comprises a plurality of processors.

The memory 620 is, for example, a volatile or a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 600 comprise one or more memories. The memory 620 is constructed as a part of the apparatus 600 in one embodiment. In another embodiment, the memory 620 is inserted into a slot, or connected via a port, or the like of the apparatus 600. In one embodiment, the memory 620 serves the sole purpose of storing data. In an alternative embodiment, the memory 620 is constructed as a part of an apparatus serving other purposes, such as processing data.

FIG. 7 shows a flow chart of a process according to some example embodiments. The process starts from moving first and second body parts to opened configuration and revealing user input equipment, 710. Notice that some other user input devices (such as keys 112 and 114) may be accessible also in the closed configuration. In some embodiments, a user apparatus (such as any apparatus described in the foregoing) directly detects the moving of the first and second body parts to the open configuration. In some other embodiments, the user apparatus detects this moving indirectly from detecting use of user equipment (e.g. from step 720 that is next discussed).

User input equipment use is detected 720. Depending on current context and embodiment, the user input is used locally (in step 760) or an indication of the user input is sent to external equipment, 730. In the latter case, in some embodiments, feedback information is received 740 from the external device and feedback is provided 750 to the user based on the received feedback information.

It is also detected 770 whether the open configuration is still in use and if yes, the process resumes to step 720, otherwise the process resumes to step 710 when the first and second body parts are again moved to the opened configuration. The first step of moving the first and second body parts can be performed by a user, while the other steps of FIG. 7 are in some embodiments controlled by a processor using its instructions stored in a memory accessible to the processor.

A skilled person appreciates that in addition to the elements shown in FIG. 6, in other embodiments the apparatus 600 comprises other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, a disposable or rechargeable battery (not shown) for powering the apparatus 600 when external power if external power supply is not available, and/or other elements.

Without in any way limiting the scope, interpretation, or application of the claims appearing below, a technical effect of one or more of the example embodiments disclosed herein is that the user is provided with a user input equipment that resides on a rear side of the apparatus and is concealed when the apparatus is brought from the open to the closed configuration. Another technical effect of one or more of the example embodiments disclosed herein is that the user input equipment is sandwiched between the movable body parts and thus is protected from undesired contact with other objects or the fabric of pockets when pocketed by the user. Another technical effect of one or more of the example embodiments disclosed herein is that the apparatus can be made compact for pocketing so that there are no protruding or potentially confusing user controls behind the apparatus when compacted. Another technical effect of one or more of the example embodiments disclosed herein is that the user input equipment is usable for gaming applications and for other applications such as web browsing, cursor control, text entry and shortcuts to preset and/or user defined services, functions and/or applications.

If desired, the different functions discussed herein may be performed in a different order and/or concurrently with each other. Furthermore, if desired, one or more of the above-described functions may be optional or may be combined.

Although various aspects of this document are set out in the independent claims, other aspects of this document comprise other combinations of features from the described embodiments and/or the dependent claims with the features of the independent claims, and not solely the combinations explicitly set out in the claims.

It is also noted herein that while the above describes example embodiments of this document, these descriptions should not be viewed in a limiting sense. Rather, there are several variations and modifications which may be made without departing from the scope of the present invention as defined in the appended claims.

I claim:

1. An apparatus, comprising:
a first body part comprising a keypad;
a second body part comprising a display;
a support mechanism configured to keep the first and second body parts together while enabling a user to move the first and second body parts between a closed configuration and an open configuration; wherein:
in the closed configuration, the first and second body parts are stacked and the support mechanism is sandwiched between the first and second body parts; and
the apparatus further comprising user input equipment comprising at least one of a key separate from said keypad and a touchpad positioned such that the user input equipment is located behind the display when the first and second body parts are in the open configuration.

2. The apparatus of claim 1, the support mechanism comprising a tilt bridge.

3. The apparatus of claim 2, wherein the tilt bridge is configured to cause in the open configuration that the second body part protrudes away from the first body part and the tilt bridge is accessible by the user.

4. The apparatus of claim 2, wherein the tilt bridge is configured to cause in the open configuration that the first and second body parts tilt towards the user when placed for use on a desk in front of the user.

5. The apparatus of claim 2, wherein the user input equipment is supported by the tilt bridge.

6. The apparatus of claim 3, wherein the user input equipment is supported by the tilt bridge.

7. The apparatus of claim 4, wherein the user input equipment is supported by the tilt bridge.

8. The apparatus of claim 1, the second body part comprising a display on an exterior surface of the second body part, wherein the user input equipment is so positioned that the user is able to hold the apparatus with one or two hands and access the user input equipment behind the display when the first and second body parts are in the opened configuration.

9. The apparatus of claim 2, the second body part comprising a display on an exterior surface of the second body part, wherein the user input equipment is so positioned that the user is able to hold the apparatus with one or two hands and access the user input equipment behind the display when the first and second body parts are in the opened configuration.

10. The apparatus of claim 1, further comprising a communication interface and a processor configured to cause the communication interface to send to external equipment information indicative of the use of the user input equipment.

11. The apparatus of claim 10, wherein the processor is further configured to cause the communication interface to receive from the external equipment feedback information and the apparatus further comprising a user interface configured to provide the user with feedback based on the feedback information.

12. The apparatus of claim 5, further comprising a communication interface and a processor configured to cause the communication interface to send to external equipment information indicative of the use of the user input equipment.

13. The apparatus of claim 12, wherein the processor is further configured to cause the communication interface to receive from the external equipment feedback information and the apparatus further comprising a user interface configured to provide the user with feedback based on the feedback information.

14. The apparatus of claim 1, further comprising a processor configured to run an application, to receive input for the application from the user input equipment, and to pass the received input to the application.

15. A method comprising:
keeping with a support mechanism a first body part comprising a keypad and a second body part comprising a display of an apparatus together while enabling a user to move the first and second body parts between a closed configuration and an open configuration; wherein:

in the closed configuration, keeping the first and second body parts stacked and the support mechanism sandwiched between the first and second body parts; and user input equipment comprising at least one of a key separate from said keypad and a touchpad is located behind the display when the first and second body parts are in the open configuration.

16. The method of claim 15, further comprising causing by a tilt bridge in the open configuration that the second body part protrudes away from the first body part and the tilt bridge is accessible by the user.

17. The method of claim 15, further comprising causing by a tilt bridge in the open configuration that the first and second body parts tilt towards the user when placed for use on a desk in front of the user.

18. The method of claim 15, sending to external equipment information indicative of the use of the user input equipment.

19. The method of claim 18, further comprising receiving from the external equipment feedback information and providing the user with feedback based on the feedback information.

20. The method of claim 15, further comprising running an application, receive input for the application from the user input equipment, and passing the received input to the application.

* * * * *